Nov. 6, 1951 L. ZAIGER ET AL 2,574,310
FENDER FLAP SUPPORT
Filed May 26, 1949 2 SHEETS—SHEET 1
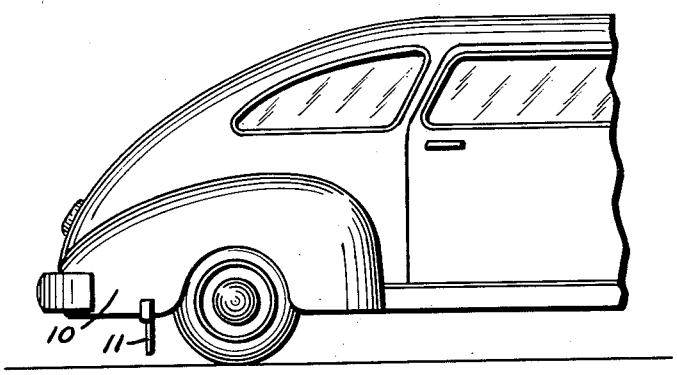
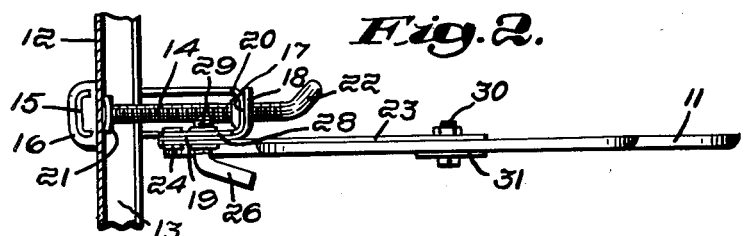
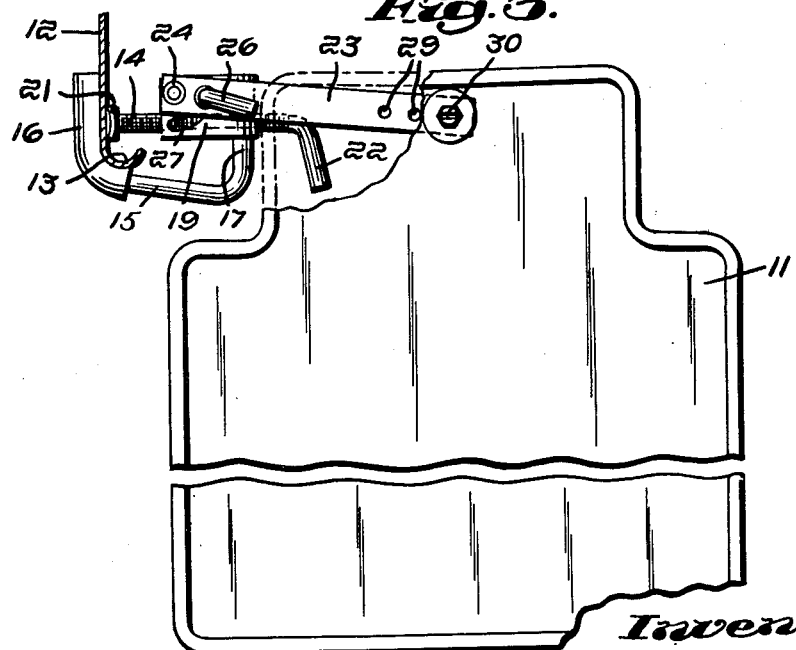
Inventors:
Louis Zaiger,
Robert I. Lappin,
by Thomson & Thomson
Attorneys Nov. 6, 1951 — L. ZAIGER ET AL — 2,574,310
FENDER FLAP SUPPORT
Filed May 26, 1949 — 2 SHEETS—SHEET 2
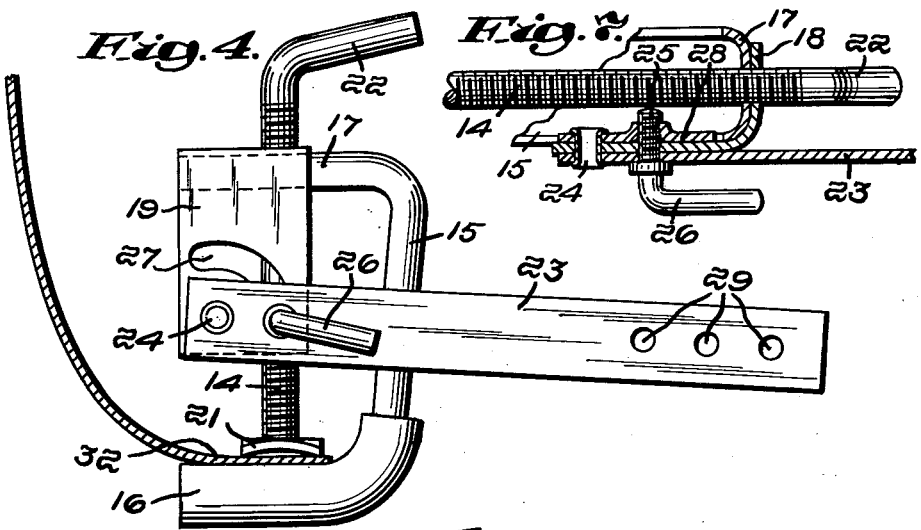
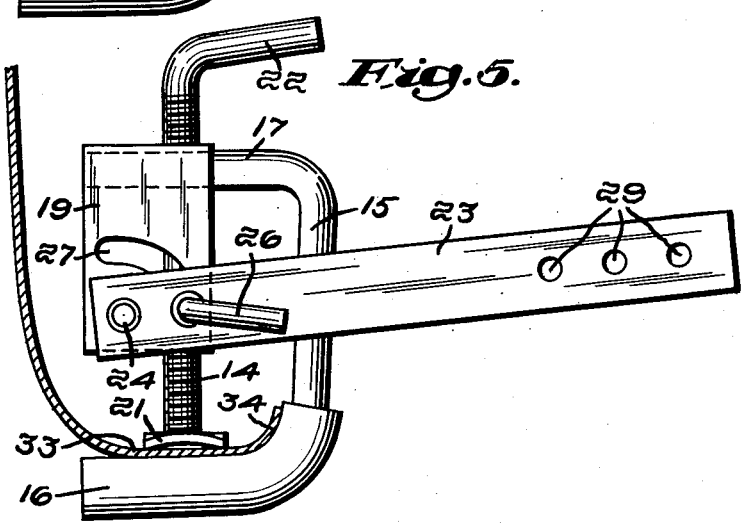
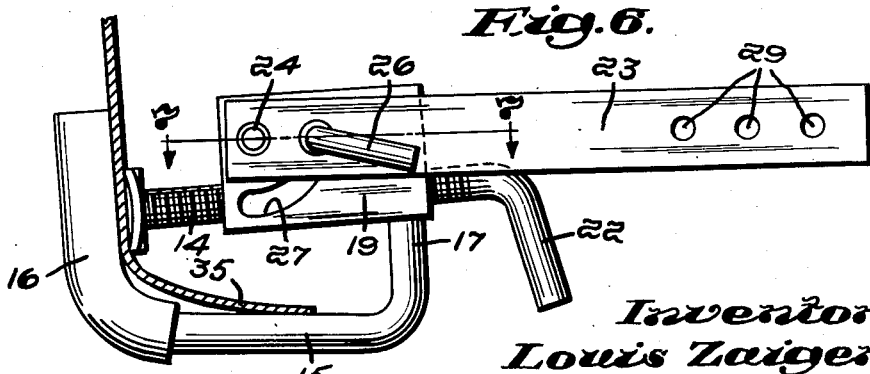
Inventors:
Louis Zaiger,
Robert I. Lappin,
by Thomson & Thomson
Attorneys Patented Nov. 6, 1951

2,574,310

UNITED STATES PATENT OFFICE 2,574,310

FENDER FLAP SUPPORT

Louis Zaiger, Swampscott, and Robert I. Lappin, Marblehead, Mass.

Application May 26, 1949, Serial No. 95,487

9 Claims. (Cl. 280—154.5)

This invention relates to fender flap supports and pertains more particularly to improvements in adjustable brackets for removably mounting dust or splash guards to the rear fenders of automobiles.

The principal purpose of the invention is to provide a simple, economical and efficient bracket so constructed that it may be quickly and easily clamped at the most convenient angle to a readily accessible portion of the rear fender of a motor car, regardless of the make or model of the vehicle, for supporting a flexible fender flap in proper position to obstruct dirt or water thrown up from the rear wheels of the car.

As is well known, the rear fenders of the more modern automobiles have long rearward projections, so that it is not feasible to support a fender flap at the extreme rear end of the fender, and various types of mountings have been devised for attachment of the flaps to the sides or to the bottom flanges or beads of these long fenders, adjacent the rear wheels of the vehicle. So far as we are aware, none of these expedients has been universally suitable for attachment to fenders of various styles or shapes by a bracket which can be conveniently and securely clamped to the fender and which will support the depending flap in proper position, irrespective of the angle at which the bracket is clamped.

It is accordingly a further object of this invention to provide a bracket which can be clamped to the fender in substantially horizontal, vertical or other angular positions by manually turning a simple and accessible clamping screw, and which has a pivoted, flap-supporting arm which may be adjusted to any desired position through an angle of at least 45°, with respect to the clamp, and which may be easily and securely locked in adjusted position by a locking screw disposed remote from its pivot.

Further features and advantages of the improved bracket will become apparent from the following description of the recommended embodiment of the invention shown in the accompanying drawings and will be pointed out in the appended claims. It will be understood, however, that the structural details of the devices herein illustrated and described may be varied within reasonable limits without departing from the essence of the invention as defined in said claims.

In the drawings,

Fig. 1 is a fragmentary rear elevation of an automobile showing a fender flap supported on the rear fender by the improved bracket;

Fig. 2 is a fragmentary horizontal section through one type of fender having the improved fender flap support mounted thereon;

Fig. 3 is a fragmentary vertical section through a fender equipped with the bracket and fender flap of Fig. 2;

Figs. 4, 5 and 6 are vertical sections of other styles of fenders, showing the manner in which the improved bracket may be adjustably mounted to best advantage on the respective fenders; and Fig. 7 is a detail section on line 7—7 of Fig. 6.

In the form chosen for the purpose of illustration in Figs. 1 to 3, the rear fender 10, on which the fender flap 11 is supported, has an outer wall 12 terminating in an abrupt rolled bead 13 at its bottom edge, and the supporting bracket is mounted with its clamping screw 14 substantially in horizontal position, at right angles to the fender wall 12. The improved bracket comprises a U-shaped clamp 15 preferably made of channeled steel, and having its free or outer end or leg covered with a buffer sheath 16 of rubber or other suitable material, and its inner end or leg 17 welded or otherwise rigidly affixed to the back plate 18 of an L-shaped coupling member or plate 19. The inner leg 17 of the clamp is provided with a threaded boss 20 receiving the clamping screw 14 which passes through aligned openings in said leg and in the back plate 18 attached flatwise thereto.

One end of the screw 14 has a rotatable clamping plate or pad 21, preferably square-shaped and having its corners bent outwardly to provide four projections or prongs which afford a secure engagement when the fender wall 12 is gripped between the covered end 16 of the clamp and the pad 21 carried by the clamping screw. The opposite end of the screw has an offset handle 22 by which it may be quickly tightened by one hand while the other hand is holding the clamp 15 in proper position on the fender.

A flap supporting arm 23 is pivotally connected at 24 to the side of the coupling plate 19, so that the arm may be moved angularly with respect to said member and the bracket as a whole. The arm is held in adjusted angular position by a locking screw 25 having an offset handle 26. The screw 25 extends through a hole in the arm 23 and an arcuate slot 27 in the coupling plate 19, and threads into a nut plate or follower 28 disposed inside the coupling plate and attached thereto by the pivot 24 which carries the arm 23.

The slot 27 is of a length to permit adjustment of the flap supporting arm 23 through an angle of at least 45°. It will be observed that the swiveled arm is fastened in adjusted position at two points on the plate 19—namely, by the pivot 24 and the locking screw 25—which are spaced apart so that the strain on the arm connection is distributed and readily borne by the two spaced fastening members. It will also be observed that the coupling plate 19 is mounted on one side of the clamp 15 and extends intermediate the legs or jaws 16 and 17 thereof, where it affords a firm and stable brace in an out-of-the-way position.

As the locking screw 25 passes freely through the arcuate slot 27 and threads into the nut plate or follower 28 which is permanently connected to the coupling member 19 by the pivot pin or rivet 24, the angular relation of the flap arm 23 with respect to the bracket clamp may be freely adjusted by loosening the screw 25 without releasing it from the locking nut 28. Furthermore, the nut cannot turn with respect to the arm 23, and the locking screw cannot stick or bind. The screw may be quickly tightened to lock the arm in adjusted position by clamping the coupling member between the arm 23 and the nut plate 28.

The free end of the arm 23 is preferably provided with a series of holes 29 to which the fender flap 11 may be selectively connected by a screw or bolt 30 passing through the center of the top of the flap and through one of said holes 29 or other fastening means. The connection need not be tight, for the flap will thus be pivotally suspended from the end of the arm 23 and will hang vertically behind the car wheel as shown in Fig. 1. The fender flap 11 may be made of rubber or other suitable material, and its top mounting hole may be reinforced by a washer 31 if desired or otherwise.

In the arrangement shown in Figs. 1 to 3, the buffer or pad 16 of the U-clamp 15 bears against the bottom of the fender bead 13, as well as against the outer wall 12 of the fender, as best shown in Fig. 3 and the clamping screw 14 is in substantially horizontal position, as aforesaid.

When the fender wall terminates in a wide curve and substantially horizontal bottom flange 32 as shown in Fig. 4, the covered end 16 of the clamp is applied to the bottom of the flange or margin 32, so that the clamping screw 14 is in substantially vertical position. In this case, the flap supporting arm 23 is swung to the opposite end of the slot 27 of the coupling member, and the locking screw 25 is tightened to hold the arm substantially in horizontal position. It will be evident, however, that the arm 23 need not be precisely horizontal, but may be swung slightly above or below the horizontal depending upon the desired height of the fender flap as well as upon the angle at which the clamp is attached to the fender; for the suspended flap 11 will hang vertically, regardless of the angle of the supporting arm.

When the bottom of the fender wall has a reversely curved flange 33, as shown in Fig. 5, the padded end of the clamp 15 is again attached to said flange in such a way that the curved shoulder of the clamp bears against the upturned bead 34 of the fender. In this position, the clamping screw 14 is again in vertical position, as in Fig. 4, but the fender arm 23 is locked in a position slightly above the horizontal to hold the fender at a higher elevation with respect to the fender.

When the bottom of the fender wall has a wide inwardly turned flange 35, as in Fig. 6, the clamp 15 is applied substantially as in Fig. 3, but in this case the flange 35 is engaged by the clamp remote from the padded end 16. In this case, the clamping screw extends at a slight angle to the horizontal, owing to the inwardly inclined direction of the fender wall.

The mode of attachment of the improved bracket to fenders of other styles and shapes will be apparent from the foregoing, and it will be evident that the bracket affords a universal fender flap mounting for automobiles of all makes, styles and models, for all of the fenders will have either a substantially vertical wall or a substantially horizontal bottom flange to which the bracket may be securely clamped by a few turns of the clamping screw 14. After the clamping screw has been tightened, the flap-supporting arm 23 may be moved to desired angular position on the pivot 24, and the locking screw 25 is then tightened by the handle 26 to hold the arm in adjusted position. The flap is then suspended from one of the holes 29 of the arm, as previously explained and will be properly supported within the fender and behind the rear wheel of the vehicle. It will be appreciated that both the clamping screw and the locking screw may be manipulated by one hand, by reaching under the fender, either in front of or behind the applied bracket. If desired, however, the bracket may be supplied in "right" and "left" types, so that the screws can be manipulated from the rear whether the bracket is applied to the right or the left fender.

We claim:

1. A bracket for supporting a fender flap on the side wall or bottom flange of an automobile fender, comprising a substantially U-shaped clamp having one leg adapted to engage the outside of the fender and the other leg disposable in spaced relation to the inside of the fender, a clamping screw threading in said other leg and having an end adapted to engage the inside of the fender, a coupling member fixed to said other leg and extending inwardly thereof toward said one leg, a flap-supporting arm pivotally connected to said coupling member for angular movement relative to said clamp, and fastening means engaging said arm and coupling member remote from said pivotal connection for releasably securing said arm in adjusted angular position.

2. A bracket for supporting a fender flap on the side wall or bottom flange of an automobile fender, comprising a substantially U-shaped clamp having one leg adapted to engage the outside of the fender and the other leg disposable in spaced relation to the inside of the fender, a clamping screw threading in said other leg and having an end adapted to engage the inside of the fender, a coupling member fixed to said other leg and extending inwardly thereof toward said one leg, a flap-supporting arm pivotally connected to said coupling member for angular movement relative to said clamp, said coupling member having a portion disposed parallel to said arm and having an arcuate slot therethrough, said slot being remote from said pivotal connection, and means including a locking screw passing through said arm and said slot for releasably securing the arm in adjusted angular position.

3. A bracket for supporting a fender flap on the side wall or bottom flange of an automobile fender, comprising a substantially U-shaped clamp having one leg adapted to engage the outside of the fender and the other leg disposable in spaced relation to the inside of the fender, a clamping screw threading in said other leg and having an end adapted to engage the inside of the fender, a coupling member fixed to said other leg and extending inwardly thereof toward said one leg, a flap-supporting arm pivotally connected to said coupling member for angular movement relative to said clamp, said coupling member having a portion disposed parallel to said arm and having an arcuate slot therethrough, said slot being remote from said pivotal connection, a nut plate attached to said member at said pivotal connection, and a locking screw passing through said arm and said slot and threading into said nut plate for clamping said portion between the arm and plate to secure the arm in adjusted angular position.

4. A bracket for supporting a fender flap on the side wall or bottom flange of an automobile fender, comprising a substantially U-shaped clamp having one leg adapted to engage the outside of the fender, a clamping screw threading in the other leg of said clamp and adapted to engage the inside of the fender, a coupling plate attached to said other leg and extending inwardly thereof toward said one leg, a supporting arm pivotally connected to said plate for angular movement relative to said clamp, and locking means associated with said arm and said plate remote from the pivotal connection therebetween for securing the arm in adjusted angular position.

5. A bracket for supporting a fender flap on the side wall or bottom flange of an automobile fender, comprising a substantially U-shaped clamp having one leg adapted to engage the outside of the fender, a clamping screw threading in the other leg of said clamp and having an end portion adapted to engage the inside of the fender, a coupling plate attached to said other leg and extending inwardly thereof toward said one leg, a supporting arm pivotally connected to said plate for angular movement relative to said clamp, the coupling plate having an arcuate slot concentric with and remote from said pivotal connection, and a locking screw passing through said arm and said slot for securing the arm in adjusted angular position, each of said screws having an angularly offset handle by which they may be manually manipulated.

6. A bracket for supporting a fender flap on the side wall or bottom flange of an automobile fender, comprising a substantially U-shaped clamp having a first leg adapted to engage the outside of the fender, and a second leg disposable in spaced relation to the inside of the fender, a clamping screw threading in said second leg and having a rotatable pad adapted to engage the inside of the fender, a coupling member fixed to said second leg and having a portion extending inwardly of said second leg toward the first leg and disposed in a plane substantially parallel to the plane of the clamp, a supporting arm pivotally connected to said member for angular movement relative to said clamp, said portion having an arcuate slot concentric with and remote from said pivotal connection, a nut plate attached to said member at said pivotal connection, and a locking screw passing through said arm and said slot and threading into said nut plate for securing the arm in adjusted angular position.

7. A bracket for supporting a fender flap on the side wall or bottom flange of an automobile fender, comprising a substantially U-shaped clamp having a pair of spaced leg portions one of which is adapted to engage the outside of the fender and the other of which is disposable in spaced relation to the inside of the fender, a clamping screw threading in said other leg portion and adapted to engage the inside of the fender to secure the clamp thereon, a coupling plate fixed to said other leg portion and having a portion extending inwardly of said other leg portion toward the first leg portion substantially parallel to the plane of the clamp, a flap-supporting arm pivotally connected to said plate portion for angular movement relative to said clamp, and fastening members associated with said plate portion and arm at two points spaced from each other for releasably securing the arm in angularly adjusted position, one of said members constituting the pivotal connection between the arm and plate portion.

8. In combination, a clamp for attachment to a fender, including a U-shaped frame, one leg of which defines a fixed clamping jaw, a movable clamping jaw supported by said frame for movement with respect to and clamping cooperation with said fixed jaw, an arm, means mounting said arm at one end thereof to said frame, such mounting means permitting gradual angular adjustments of said arm in infinitely small increments with respect to said frame, a fender flap, means mounting said flap on said arm adjacent its other end, said mounting means permitting angular and lateral adjustments of the fender flap with respect to said arm.

9. In combination, a clamp for attachment to a fender, comprising a substantially U-shaped frame, one leg of which defines a fixed clamping jaw, a movable clamping jaw supported by said frame for movement with respect to and clamping cooperation with said fixed jaw, a coupling plate carried by said frame, a flap supporting arm, means mounting said arm at one end thereof to said plate, such mounting means comprising a pivotal connection and fastening elements adjacent said connection, and said means permitting gradual angular adjustment of said arm in infinitely small increments with respect to said plate and said frame, a fender flap, and means mounting said flap on said arm adjacent its other end.

LOUIS ZAIGER.
ROBERT I. LAPPIN.

REFERENCES CITED

The following references are of record in the file of this patent:

UNITED STATES PATENTS

| Number | Name | Date |
|---|---|---|
| 1,282,489 | Strodel | Oct. 22, 1918 |
| 1,794,122 | Schaffer | Feb. 24, 1931 |
| 1,834,682 | Colstad | Dec. 1, 1931 |
| 2,084,087 | Jackson | June 15, 1937 |
| 2,243,388 | Magyarosi | May 27, 1941 |